United States Patent
Tremblay et al.

(10) Patent No.: US 11,368,637 B1
(45) Date of Patent: Jun. 21, 2022

(54) IMAGE ACQUISITION METHOD FOR MICROBOLOMETER THERMAL IMAGING SYSTEMS

(71) Applicant: INSTITUT NATIONAL D'OPTIQUE, Quebec (CA)

(72) Inventors: Bruno Tremblay, Quebec (CA); Alain Bergeron, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 17/177,891

(22) Filed: Feb. 17, 2021

(51) Int. Cl.
  *H04N 5/33* (2006.01)
  *G01J 5/00* (2022.01)
  *H04N 5/378* (2011.01)

(52) U.S. Cl.
  CPC ............. *H04N 5/33* (2013.01); *G01J 5/0003* (2013.01); *H04N 5/378* (2013.01); *G01J 2005/0077* (2013.01)

(58) Field of Classification Search
  CPC .......... H04N 5/33; H04N 3/09; H04N 5/2173; H04N 5/2254; H04N 5/58; G06V 10/145; G06V 10/60; G06V 40/161; G06V 40/166; H01L 2924/00; G01J 2005/0077; G01J 5/026; G01J 5/0265; G01J 5/027; G01J 5/028; G01J 5/0804; G01J 5/0806; G01J 5/12; G01J 5/48; G02B 7/10
  USPC ....................................................... 348/164
  See application file for complete search history.

(56) References Cited

U.S. PATENT DOCUMENTS

| 4,072,863 | A | * | 2/1978 | Roundy | G01J 5/34 250/338.3 |
| 4,073,576 | A | * | 2/1978 | Bastian | H04N 5/33 348/E5.09 |
| 4,158,136 | A | | 6/1979 | Felix et al. | |
| 4,741,626 | A | | 5/1988 | Hashimoto | |
| 4,808,822 | A | | 2/1989 | Manning et al. | |
| 4,965,447 | A | * | 10/1990 | Bly | G01D 5/40 250/233 |
| 5,051,591 | A | * | 9/1991 | Trotta | H04N 5/33 250/350 |
| 5,136,421 | A | | 8/1992 | Sagan | |
| 9,268,197 | B1 | | 2/2016 | DiGregorio et al. | |
| 2010/0219327 | A1 | * | 9/2010 | Arbore | H02S 50/10 250/206 |

(Continued)

*Primary Examiner* — Masum Billah
(74) *Attorney, Agent, or Firm* — Fitch, Even, Tabin & Flannery LLP

(57) ABSTRACT

A method and system for imaging a target scene using a microbolometer array having multiple lines of microbolometer pixels are disclosed. Each line is switchable between an exposed state and a shielded state, where the line is exposed to the target scene and a reference scene, respectively. The method may include alternating between generating a target frame of the target scene and generating a reference frame of the reference scene, each of which in a rolling shutter mode. The method may also include, concurrently with the generating steps, alternating between sequentially shielding each line after its readout in the exposed state for its next readout in the shielded state, and sequentially exposing each line after its readout in the shielded state for its next readout in the exposed state. The method may also include adjusting the target frames using the reference frames to generate thermal images of the target scene.

20 Claims, 6 Drawing Sheets

(56) References Cited

U.S. PATENT DOCUMENTS

| | | | | |
|---|---|---|---|---|
| 2010/0270469 A1* | 10/2010 | Johnson | ............ | G02B 7/10 |
| | | | | 359/825 |
| 2014/0226021 A1* | 8/2014 | Koechlin | ............ | H04N 5/33 |
| | | | | 250/338.3 |
| 2018/0131880 A1 | 5/2018 | Hicks et al. | | |

* cited by examiner

US 11,368,637 B1

IMAGE ACQUISITION METHOD FOR MICROBOLOMETER THERMAL IMAGING SYSTEMS

TECHNICAL FIELD

The technical field generally relates to thermal imaging and, more particularly, to an image acquisition method for use in microbolometer thermal imaging systems.

BACKGROUND

Thermal imaging systems based on arrays of uncooled microbolometer detectors are used for various commercial, industrial, and military applications. These systems are configured to detect electromagnetic radiation, typically infrared radiation, emitted by the objects and living bodies present in a scene being viewed. The detected radiation is converted into electrical signals on a per-detector basis. Each electrical signal is associated with a respective microbolometer detector and its voltage (or current) amplitude relates to the amount of radiant energy received from a corresponding region of the scene. The electrical signals are processed in order to generate a thermal image representative of the spatial temperature distribution of the scene. Because they can operate at room temperature, uncooled microbolometer detectors are well suited for integration within compact and robust devices that are often less expensive and more reliable than those based on cooled detectors. Other possible advantages of uncooled microbolometers include reduced power consumption, smaller size, reduced weight, and spectrally broadband imaging capabilities. However, uncooled microbolometer arrays also have some drawbacks and limitations. Because of their passive and uncooled operation, their widespread, if not almost universal, use of a rolling shutter readout scheme, and their relatively slow thermal response times, microbolometer arrays tend to be affected by various types of noise, including random noise, fixed pattern noise, and banding noise, which can lead to signal-to-noise ratio (SNR) degradation. While approaches have been used to mitigate these issues, such as digital noise reduction processing, frame averaging, and reference-frame subtraction, a number of challenges remain.

SUMMARY

The present description generally relates to image acquisition techniques for use in microbolometer thermal imaging systems operating in a rolling shutter mode.

In accordance with an aspect, there is provided a method of imaging a target scene using a thermal imaging system including an uncooled microbolometer array having a plurality of lines of microbolometer pixels, each line of microbolometer pixels being individually switchable between an exposed state, where the line is exposed to electromagnetic radiation from the target scene, and a shielded state, where the line is shielded from electromagnetic radiation from the target scene and exposed to electromagnetic radiation from a reference scene, the method including:

performing a frame generation operation to generate a set of target image frames of the target scene and a set of reference image frames of the reference scene, the frame generation operation including alternating between:

generating a current one of the target image frames, said generating including sequentially reading out each line of microbolometer pixels in the exposed state; and generating a current one of the reference image frames, said generating including sequentially reading out each line of microbolometer pixels in the shielded state;

performing a state switching operation concurrently with the frame generation operation, the state switching operation including alternating between:

sequentially causing each line of microbolometer pixels to switch to the shielded state after the readout thereof in the exposed state during the generation of the current target image frame, in preparation for the generation of a next one of the reference image frames; and sequentially causing each line of microbolometer pixels to switch to the exposed state after the readout thereof in the shielded state during the generation of the current reference image frame, in preparation for the generation of a next one of the target image frames; and adjusting the target image frames using the reference image frames to generate thermal images of the target scene.

In accordance with another aspect, there is provided a thermal imaging system for imaging a target scene, the thermal imaging system including:

an uncooled microbolometer array including a plurality of lines of microbolometer pixels and a readout circuitry electrically connected to the microbolometer pixels;

an imaging optic assembly configured to form an intermediate image of the target scene in an intermediate image plane and to project the intermediate image onto the microbolometer pixels;

an optical chopper disposed in the intermediate image plane, the optical chopper being configured to cause each line of microbolometer pixels to individually switch between an exposed state, where the line is exposed to electromagnetic radiation from the target scene, and a shielded state, where the line is shielded from electromagnetic radiation from the target scene and exposed to electromagnetic radiation from a reference scene defined by the optical chopper; and a control and processing unit coupled to the uncooled microbolometer array and to the optical chopper, the control and processing unit being configured to:

perform a frame generation operation to generate a set of target image frames of the target scene and a set of reference image frames of the reference scene, the frame generation operation including alternating between:

generating a current one of the target image frames, said generating including controlling the readout circuitry to sequentially read out each line of microbolometer pixels in the exposed state; and generating a current one of the reference image frames, said generating including controlling the readout circuitry to sequentially read out each line of microbolometer pixels in the shielded state;

perform a state switching operation concurrently with the frame generation operation, the state switching operation including alternating between:

controlling the optical chopper to sequentially cause each line of microbolometer pixels to switch to the shielded state after the readout thereof in the exposed state during the generation of the current target image frame, in preparation for the generation of a next one of the reference image frames; and controlling the optical chopper to sequentially cause each line of microbolometer pixels to switch to the exposed state after the readout thereof in the shielded state during the generation of the current reference image frame, in preparation for the generation of a next one of the target image frames; and adjust the target image frames using the reference image frames, to generate thermal images of the target scene.

Other method and process steps may be performed prior to, during or, after the method and process steps described herein. The order of one or more of the steps may also differ, and some of the steps may be omitted, repeated, and/or combined, as the case may be. Furthermore, some method steps may be performed using various image analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the foregoing detailed description may be described with respect to specific embodiments or aspects, it should be noted that these specific features may be combined with one another unless stated otherwise.

DETAILED DESCRIPTION

Figure 1:
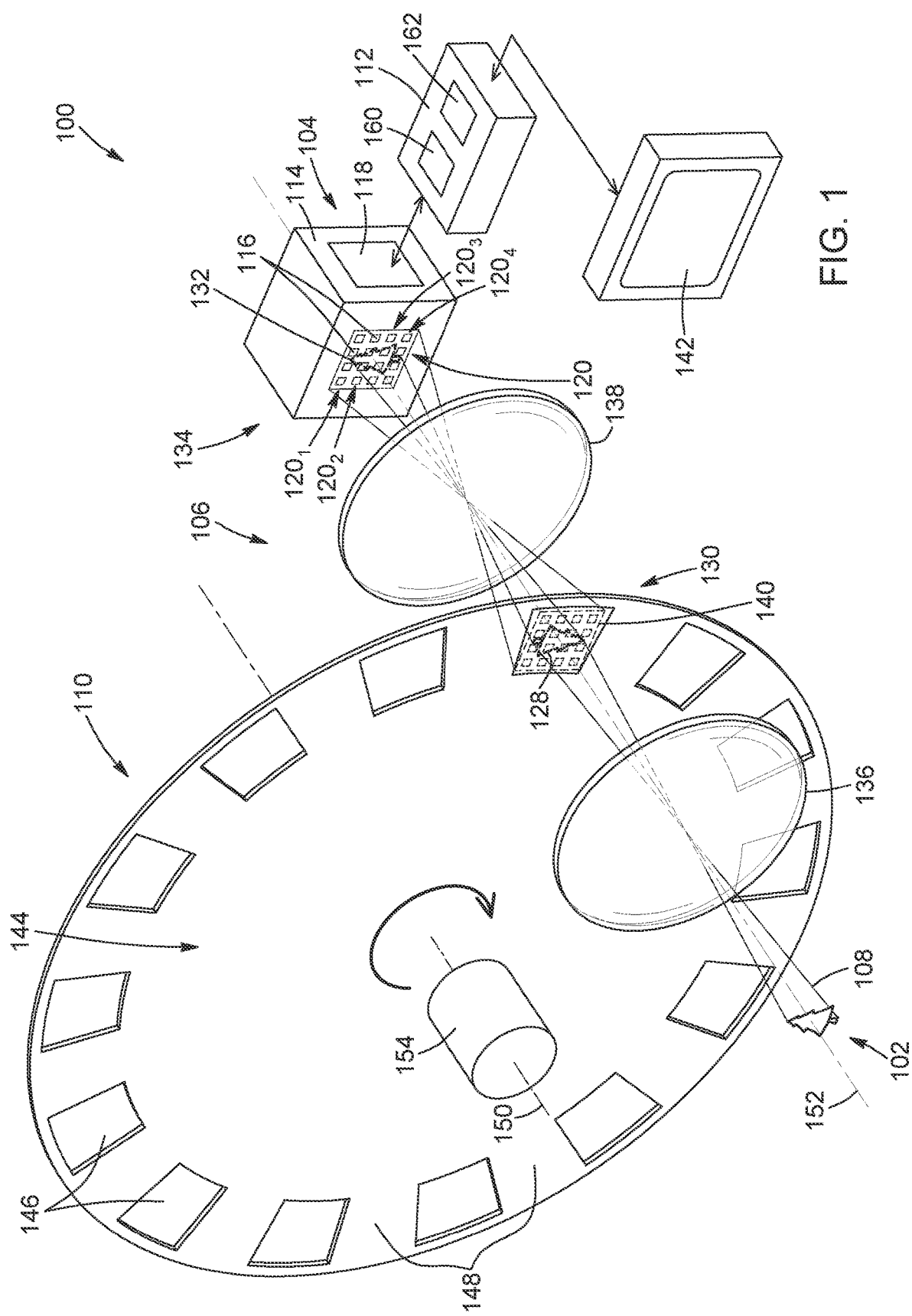
FIG. 1 is a schematic perspective view of an embodiment of a thermal imaging system, depicted in a first operating configuration.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including: time-coincident or simultaneous occurrence of two processes; occurrence of a first process that both begins and ends during the duration of a second process; and occurrence of a first process that begins after the start of a second process, but ends after the completion of the second process.

The present description generally relates to image acquisition techniques for use in microbolometer thermal imaging systems operating in a rolling shutter mode, for example, to provide enhanced SNR. The present techniques have potential use in a variety of commercial, industrial, and military applications that may benefit from or require uncooled microbolometer imaging systems capable of producing thermal images with reduced noise. Non-limiting examples of possible fields of use include, to name a few, defense and security, aerospace and astronomy, inspection and maintenance, medicine, night vision, robotics, transportation, pollution and fire detection, spectroscopy, and remote sensing.

The terms "light" and "optical", and variants and derivatives thereof, refer herein to radiation in any appropriate region of the electromagnetic spectrum. These terms are not limited to visible light, but may also include, without being limited to, the infrared, terahertz, and millimeter wave regions. By way of example, in some embodiments, the present techniques may be used with electromagnetic radiation having a wavelength in the infrared region. Infrared radiation is commonly divided into various regions. One common division scheme defines the near-infrared (NIR) region for wavelengths ranging from 0.7 to 1 µm; the short-wave infrared (SWIR) region for wavelengths ranging from 1 to 3 µm; the mid-wave infrared (MWIR) region for wavelengths ranging from 3 to 5 µm; the long-wave infrared (LWIR) region for wavelengths ranging from 7 to 14 µm; and the very long-wave-infrared (VLWIR) region for wavelengths ranging from 14 to 1000 µm and even further. The definitions of different infrared regions in terms of spectral ranges, as well as their limits, may vary depending on the technical field under consideration, and are not meant to limit the scope of application of the present techniques. Furthermore, although several embodiments of the present techniques may be useful in infrared applications, other embodiments could additionally or alternatively operate in other regions of the electromagnetic spectrum, for example, in the terahertz region.

The term "thermal imaging", and variants and derivatives thereof, refers herein to an imaging technique in which electromagnetic radiation emitted from objects and living bodies present in a scene being viewed is detected and processed to output an image representative of a spatial temperature distribution within the scene. Thermal imaging typically operates in the infrared portion of the electromagnetic spectrum, notably in the MWIR and LWIR regions, where radiation emitted from an object is a function of the object's temperature and emissivity. The term "thermal imaging system" refers herein to a non-contact imaging device configured to detect thermal radiation originating from a scene using an array of thermal detectors. Thermal images can be displayed as single images, sequences of images, or video streams. The term "thermal radiation detector" refers herein to a device configured to absorb electromagnetic radiation incident thereon, convert the absorbed radiation into heat, and produce a change in an electrical parameter thereof in response to temperature variations caused by the heat generated by the absorbed radiation. Non-limiting examples of thermal radiation detectors include microbolometer detectors, thermocouple/thermopile detectors, and pyroelectric detectors. The term "microbolometer" refers herein to a thermal radiation detector that includes a thermistor, which is a piece of material whose electrical resistance changes in response to temperature variations caused by the heat generated by absorbed radiation. It is appreciated that the use of the term "thermal" refers herein to the fact that the operation of thermal radiation detectors such as those disclosed herein involves the conversion of electromagnetic radiation into heat. In particular, the term "thermal" does not mean that the thermal radiation detectors disclosed herein are limited to detecting "thermal radiation", which is a term whose scope is sometimes limited to infrared radiation.

The term "rolling shutter" refers herein to a method of image acquisition in which an image frame, or simply a frame, is acquired in a sequential manner so that each line of the frame is recorded at a slightly different time. In contrast, the term "global shutter" refers to a method of image acquisition in which the responses of all the pixels of a frame are recorded simultaneously.

As described in greater detail below, a method of imaging a target scene with a thermal imaging system having an uncooled microbolometer array is disclosed herein. The microbolometer array includes a plurality of lines of microbolometer pixels. Each line of microbolometer pixels is individually switchable between an exposed state, where the line is exposed to electromagnetic radiation from the target scene, and a shielded state, where the line is shielded from electromagnetic radiation from the target scene and exposed to electromagnetic radiation from a reference scene. The switching between the exposed state and the shielded state of the individual pixel lines may be achieved by an optical chopper disposed in the field of view of the microbolometer array. In such a case, the optical chopper may define the reference scene viewed by the microbolometer pixels in the shielded state. The method generally includes a frame generation operation and a state switching operation, which are performed concurrently with each other.

The frame generation operation may include alternating between a step of generating a target image frame (or simply "target frame") of the target scene and a step of generating a reference image frame (or simply "reference frame") of the reference scene. Depending on the application, the sequence of frames may be generated starting with a target frame (i.e., first target frame, first reference frame, second target frame, second reference frame, and so on) or a reference frame (i.e., first reference frame, first target frame, second reference frame, second target frame, and so on). The generation of a target frame may involve performing a rolling shutter readout process that includes sequentially reading out each pixel line in the exposed state. Likewise, the generation of a reference frame may involve performing a rolling shutter readout process that includes sequentially reading out each pixel line in the shielded state.

The state switching operation may include alternating between a step of sequentially causing each pixel line to transition to the shielded state immediately or shortly after the readout thereof in the exposed state, in preparation for the generation of the next reference frame, and a step of sequentially causing each pixel line to transition to the exposed state immediately or shortly after the readout thereof in the shielded state, in preparation for the generation of the next target frame. Depending on the frame generation order, the state switching operation may be performed starting with the pixel lines in the exposed state (i.e., first sequential switching to the shielded state, first sequential switching to the exposed state, second sequential switching to the shielded state, second sequential switching to the exposed state, and so on) or in the shielded state (i.e., first sequential switching to the exposed state, first sequential switching to the shielded state, second sequential switching to the exposed state, second sequential switching to the shielded state, and so on).

The method also includes adjusting the target frames using the reference frames, to generate thermal images of the target scene, for example, by subtracting each reference frame from a corresponding target frame.

It is appreciated that by switching the state of each pixel line immediately or shortly after its readout in a given state, the time available for its microbolometers to reach a stabilized or steady-state temperature before the next readout in the other state is maximized or at least significantly increased. As a result, performance issues related to the finite thermal response time of uncooled microbolometers can be avoided or at least reduced. The term "uncooled" refers herein to microbolometers that can be operated at or near room temperature without cryogenic cooling.

Various aspects and implementations of the present techniques are described below with reference to the figures.

Referring to FIG. 1, there is illustrated an embodiment of a thermal imaging system 100 for imaging a target scene 102. The thermal imaging system 100 generally includes an uncooled microbolometer array 104; an imaging optic assembly 106 configured to image electromagnetic radiation 108 received from the target scene 102 onto the microbolometer array 104; an optical chopper 110 interposed between the microbolometer array 104 and the target scene 102 to control the amount of radiant energy reaching the microbolometer array 104; and a control and processing unit 112. The structure and operation of these and other possible components of the thermal imaging system 100 are described in greater detail below.

The uncooled microbolometer array 104 includes a substrate 114, a plurality of microbolometer pixels 116 arranged on the substrate 114 in a matrix of rows and columns, and a readout circuitry 118 electrically connected to the plurality of microbolometer pixels 116. The substrate 114 may be made of silicon or another suitable material capable of providing mechanical support to the microbolometer array 104. FIG. 1 depicts a 4×4 microbolometer array 104 for simplicity. In practice, however, the number of microbolometer pixels 116 in the array 104 is significantly larger. For example, in some embodiments, the microbolometer array 104 may include from about 160×120 to about 1024×768 pixels, with a pixel pitch ranging from about 10 μm to about 50 μm. Depending on the application, the microbolometer pixels 116 may or may not be all identical.

The uncooled microbolometer array 104 defines a plurality of lines 120 of microbolometer pixels 116, as described in greater detail below. The term "line of microbolometer pixels" may refer herein to a single row or a few rows (e.g., less than five or ten) of microbolometer pixels or to a single column or a few columns (e.g., less than five or ten) of microbolometer pixels. For example, the microbolometer array 104 depicted in FIG. 1 includes four microbolometer pixel lines 120, each of which corresponding to one row of four microbolometer pixels 116. The microbolometer pixel lines are hereinafter referred to generally and collectively as 120, but individually as $120_1$ to $120_4$.

Figure 2:
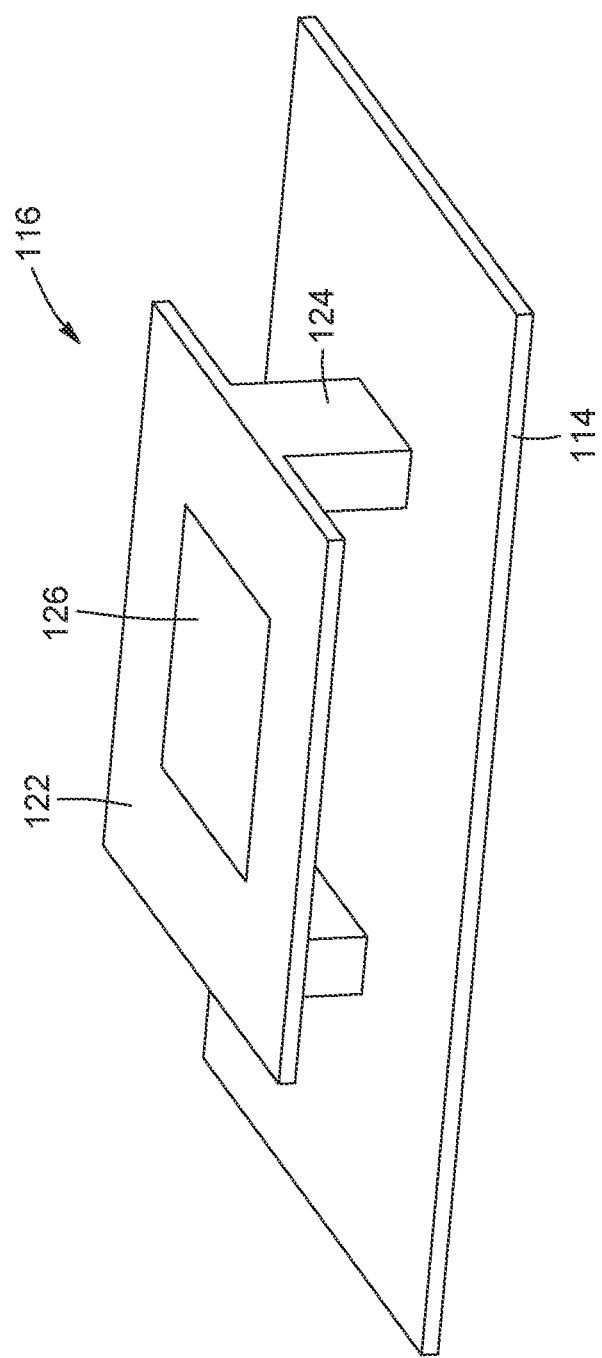
FIG. 2 is a schematic perspective view of an example of a microbolometer pixel for use in the techniques disclosed herein.

Depending on the application, the microbolometer pixels 116 can have various configurations and can be made of various materials. FIG. 2 depicts a schematic representation of an example of a microbolometer pixel 116, which may be used in the microbolometer array 104 of the thermal imaging system 100 of FIG. 1. The microbolometer pixel 116 generally includes a suspended platform 122, a support structure 124 configured to hold the platform 122 above a substrate 114, and a thermistor 126 disposed on the platform 122. The suspension of the platform 122 above the substrate 114 provides thermal isolation of the thermistor 126 to enhance the detection sensitivity of the microbolometer pixel 116. The thermistor 126 may be embodied by any suitable material, structure, or device having an electrical resistance that changes as a function of its temperature in a predictable and controllable manner. Non-limiting examples of thermistor materials include vanadium oxide and amorphous silicon. The microbolometer pixels 116 may be fabricated using common integrated-circuit and microfabrication techniques, such as surface and bulk micromachining. The microbolometer pixel 116 may be characterized by its thermal time constant, $\tau = C/G$, which is given by the ratio of the heat capacity C of the microbolometer pixel 116 to the thermal conductance G between the microbolometer pixel 116 and its environment. The thermal time constant $\tau$ is a measure of how quickly the microbolometer pixel 116 can react to a change in incoming radiation levels. Typical microbolometers have a thermal time constant ranging from about 2 to about 25 milliseconds (ms). The theory, operation, and applications of uncooled microbolometer arrays are generally known in the art, and need not be described in detail herein other than to facilitate an understanding of the present techniques.

Returning to FIG. 1, the readout circuitry 118 is configured to measure changes in the electrical resistance of the thermistor of each microbolometer pixel 116 and to provide an electrical output signal (e.g., a voltage and/or a current) whose amplitude is representative of the measured changes in electrical resistance. The readout circuitry 118 may be provided in or outside of the substrate 114. The readout circuitry 118 may include a number of passive and/or active components (e.g., analog-to-digital converters, buffers, integrators, timing components) and may be implemented using a variety of circuit architectures and designs. In some embodiments, the readout circuitry 118 may be embodied by one or more complementary metal-oxide-semiconductor (CMOS) integrated circuit layers formed in the substrate 114.

The readout circuitry 118 is configured for implementing a rolling shutter readout scheme, in which the readout of the microbolometer pixels 116 is done row by row (or column by column, as the case may be), so that each row is recorded at a slightly different time and possibly under different scene conditions. Uncooled microbolometer arrays are generally readout in a rolling shutter mode. In such a case, the readout time for each row is determined by the readout time of the entire frame (i.e., the frame time) and the number of rows of microbolometer pixels 116. The row readout time of conventional microbolometer arrays 104 may range from about 20 μs to about 100 μs. It is appreciated that the frame rate (i.e., the inverse of the frame time) is limited by or otherwise related to the thermal time constant r of the microbolometer pixels 116. In many applications, the frame time is selected to be on the order of or longer than the thermal time constant T. In other embodiments, the readout circuitry 118 may be configured to read the microbolometer pixels 116 a few rows or columns at a time. As noted above, the generic term "line" is used herein to encompass not only a single row or column of pixels, but also a few rows or columns of pixels. The theory, operation, and applications of microbolometer readout circuits, including those employing a rolling shutter readout scheme, are generally known in the art, and need not be described in detail herein other than to facilitate an understanding of the present techniques.

The imaging optic assembly 106 is configured to form an intermediate image 128 of the target scene 102 in an intermediate image plane 130 and to project the intermediate image 128 onto the microbolometer array 104 for image capture by the microbolometer pixels 116 as a final image 132 in a final image plane 134. The term "image plane" refers herein to a surface where an image of an object or of a scene is formed. This term is not limited to strictly planar surfaces. Also, the expression "in the image plane", and variants and derivatives thereof, is to be construed herein as meaning "in or near the image plane" to account, for example, for depth-of-focus effects and the generally unavoidable presence of imperfections and limitations in the components themselves or in their assembly.

In the embodiment of FIG. 1, the imaging optic assembly 106 includes an objective lens 136 and a relay lens 138, each of which including a single lens or a plurality of lenses. In this arrangement, the intermediate image plane 130 is interposed between the objective lens 136 and the relay lens 138. The objective lens 136 is configured to form the intermediate image 128 of the target scene 102 in the intermediate image plane 130, and the relay lens 138 is configured to relay the intermediate image 128 to the final image plane 134 where the microbolometer pixels 116 are located. The intermediate image 128 is inverted with respect to the target scene 102, but the final image 132 captured by the microbolometer pixels 116 is upright. The relay lens 138 is also configured to form an image 140 of the microbolometer pixels 116 in the intermediate image plane 130.

The magnification provided by the relay lens 138 can be adjusted through its effective focal length and the distances from the intermediate image plane 130 and the final image plane 134. In some embodiments, the magnification of the relay lens 138 may be equal to one. In such a case, the intermediate image 128 and the final image 132 of the target scene 102 have the same size, and likewise for the microbolometer pixels 116 and the image 140 thereof in the intermediate image plane 130. In other embodiments, the magnification of the relay lens 138 may be different from one. By adjusting its focal length, the objective lens 136 may be configured so that the field of view of the thermal imaging system 100 encompasses a region of interest in the target scene 102. Although the imaging optic assembly 106 depicted in FIG. 1 has a two-lens arrangement, other embodiments of the imaging optic assembly 106 may include fewer or more than two lenses or refractive elements, and may also or alternatively include reflective elements and/or diffractive elements.

The optical chopper 110 is positioned in the intermediate image plane 130 and is configured for alternatingly allowing and preventing the passage of the electromagnetic radiation 108 therethrough to the relay lens 138 and onto the microbolometer pixels 116. Furthermore, the relay lens 138 is configured to form an inverted image of a portion of the optical chopper 110 in the final image plane 134.

The term "optical chopper" refers herein to a mechanical or electro-optical device configured for intermittently transmitting and interrupting a beam of electromagnetic radiation incident thereon. In the illustrated embodiment, the optical chopper 110 is a rotating disc chopper that includes a chopper disc 144 provided with a pattern including a set of radiation-transmitting regions 146 and a set of radiation-blocking regions 148 alternating with each other. The radiation-transmitting regions 146 include a plurality of apertures formed through the chopper disc 144 at a corresponding plurality of angularly spaced-apart locations along a peripheral annular region thereof. The number and arrangement of the apertures may differ in other embodiments. The radiation-blocking regions 148 correspond to opaque regions of the chopper disc 144 between the radiation-transmitting regions 146. The chopper disc 144 rotates about a rotation axis 150 passing through its center and perpendicular to its plane. The plane of the optical chopper 110 lies in the intermediate image plane 130. The rotation axis 150 is laterally offset from the optical axis 152 of the thermal imaging system 100. The optical chopper 110 may be driven into rotation by a chopper motor 154, for example, an electric motor, or another suitable driving device. The control and processing unit 112 may be operatively coupled to the chopper motor 154 to control the operation of the optical chopper 110. Upon rotation of the optical chopper 110, the intermediate image 128 of the target scene 102 is intermittently and gradually allowed to and prevented from reaching the relay lens 138 and being relayed onto the microbolometer pixels 116 as the final image 132.

The optical chopper 110 is configured to operate so that the microbolometer pixels 116 can be selectively exposed to or shielded from the electromagnetic radiation 108 received from the target scene 102 on a per-line basis. More specifically, the optical chopper 110 is controllable to cause each line 120 of microbolometer pixels 116 to individually switch between an exposed state and a shielded state. In the exposed state, a given line 120 is exposed to the electromagnetic radiation 108 from the target scene 102, whereas in the shielded state, a given line 120 is shielded from the electromagnetic radiation 108 from the target scene 102 and exposed to electromagnetic radiation 156 from a reference scene 158 defined by the radiation-blocking regions 148 of the optical chopper 110 (see, e.g., FIG. 3). The reference scene 158 may be a uniform scene having a constant temperature defined by the temperature of the optical chopper 110 itself. In FIG. 1, all of the four pixel lines 120 are in the exposed state, whereas in FIG. 3, all of the four pixel lines 120 are in the shielded state. In FIG. 4, the top three pixel lines $120_1$, $120_2$, $120_3$ are in the exposed state, while the bottom pixel line $120_4$ is in the shielded state.

Returning to FIG. 1, by sequentially reading out all of the pixel lines 120 in the exposed state, a target frame may be generated that represents an image of the target scene 102. Likewise, by sequentially reading out all of the pixel lines 120 in the shielded state, a reference frame may be generated that represents a background image of the reference scene 158 defined by any one of the radiation-blocking regions 148 of the optical chopper 110. The capability provided by the operation of the optical chopper 110 of allowing different pixel lines 120 to be switched between their exposed and shielded states at different times can be advantageous in a case where the state switching operation is synchronized or otherwise time-coordinated with a rolling shutter frame generation operation used to generate target and reference frames as part of a reference-frame subtraction technique. In contrast, conventional reference-frame subtraction techniques operate by switching the states of all of the pixel lines at or near the same time, and therefore do not synchronize or relate the rolling shutter readout operation with the state switching operation.

In FIG. 1, two conditions are implemented that allow for the microbolometer pixels 116 to be put in either a fully exposed configuration (i.e., with all of the pixel lines 120 in the exposed state) or a fully shielded configuration (i.e., with all of the pixel lines 120 in the shielded state), while also ensuring that, as the chopper disc 144 is rotated about its rotation axis 150, the time spent in either of these configurations is the same as the time spent in any of the partially exposed or shielded configurations. The first condition is that the height of each radiation-transmitting region 146 and the height of each radiation-blocking region 148 be the same as the height of the image 140 of all of the microbolometer pixels 116 in the intermediate image plane 130. The second condition is that the width of each radiation-transmitting region 146 and the width of each radiation-blocking region 148 be the same as, or greater than, the width of the image 140 of all of the microbolometer pixels 116 in the intermediate image plane 130. In this context, the terms "height" and "width" refer to dimensions along directions perpendicular and parallel to the pixel lines 120, respectively. These conditions are illustrated in FIG. 1 for the radiation-transmitting regions 146 and in FIG. 3 for the radiation-blocking regions 148. It is noted that when the relay lens 138 provides a magnification of one, the height of the individual radiation-transmitting regions 146 and the height of the radiation-blocking regions 148 are also the same as the combined height of all of the microbolometer pixels 116, and the width of the individual radiation-transmitting regions 146 and the width of the radiation-blocking regions 148 are also the same as or greater than the combined width of all of the microbolometer pixels 116.

It is appreciated that although the optical chopper 110 depicted in FIG. 1 is a mechanical rotating chopper, other embodiments of the thermal imaging system 100 may include a variety of chopper arrangements, whether mechanical (e.g., a tuning fork optical chopper) or not (e.g., an electro-optical chopper, such as a liquid crystal shutter). It is also appreciated that although the optical chopper 110 depicted in FIG. 1 is positioned in an intermediate image plane located between the object plane (e.g., target scene 102) and the final image plane (e.g., microbolometer pixels 116), other configurations are possible. For example, it could be envisioned to position the optical chopper close to the object or the final image plane (e.g., within a focusing range of these planes). The theory, operation, and applications of optical choppers are generally known in the art, and need not be described in detail herein other than to facilitate an understanding of the present techniques.

Referring still to FIG. 1, the control and processing unit 112 is operatively coupled to various components of the thermal imaging system 100, including the uncooled microbolometer array 104 and the optical chopper 110, to control and coordinate, at least partly, their operation. In particular, the control and processing unit 112 is configured to coordinate the rolling shutter readout operation performed by the readout circuitry 118 and the state switching operation performed by the optical chopper 110. The control and processing unit 112 may be provided within one or more general purpose computers and/or within any other suitable computing devices, implemented in hardware, software, firmware, or any combination thereof, and connected to the components of the thermal imaging system 100 via appropriate wired and/or wireless communication links and ports. Depending on the application, the control and processing unit 112 may be fully or partly integrated with, or physically separate from, the other components of the thermal imaging system 100. The control and processing unit 112 may include a processor 160 and a memory 162.

The processor 160 may implement operating systems and may be able to execute computer programs, also known as commands, instructions, functions, processes, software codes, executables, applications, and the like. While the processor 160 is depicted in FIG. 1 as a single entity for illustrative purposes, the term "processor" should not be construed as being limited to a single processor, and accordingly, any known processor architecture may be used. In some implementations, the processor 160 may include a plurality of processing units. Such processing units may be physically located within the same device, or the processor 160 may represent the processing functionalities of a plurality of devices operating in coordination. For example, the processor 160 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 162, which may also be referred to as a "computer readable storage medium" is capable of storing computer programs and other data to be retrieved by the processor 160. The stored data may include the target and reference frames and the thermal images generated therefrom. The terms "computer readable storage medium" and "computer readable memory" refer herein to a non-transitory and tangible computer product that can store and communicate executable instructions for the implementation of various steps of the techniques disclosed herein. The computer readable memory may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. A plurality of such storage devices may be provided, as can be appreciated by those skilled in the art. The computer readable memory may be associated with, coupled to, or included in a processor configured to execute instructions contained in a computer program stored in the computer readable memory and relating to various functions associated with the processor.

In some embodiments, the thermal imaging system 100 may include an image display device 142 connected to the control and processing unit 112 and configured to display the thermal images of the target scene 102, for example, as spatially resolved temperature maps. Various types of image display devices (e.g., standalone monitors, laptop and desktop computers, televisions, smartphones, tablet computers) and display technologies may be used for this purpose.

Figure 3:
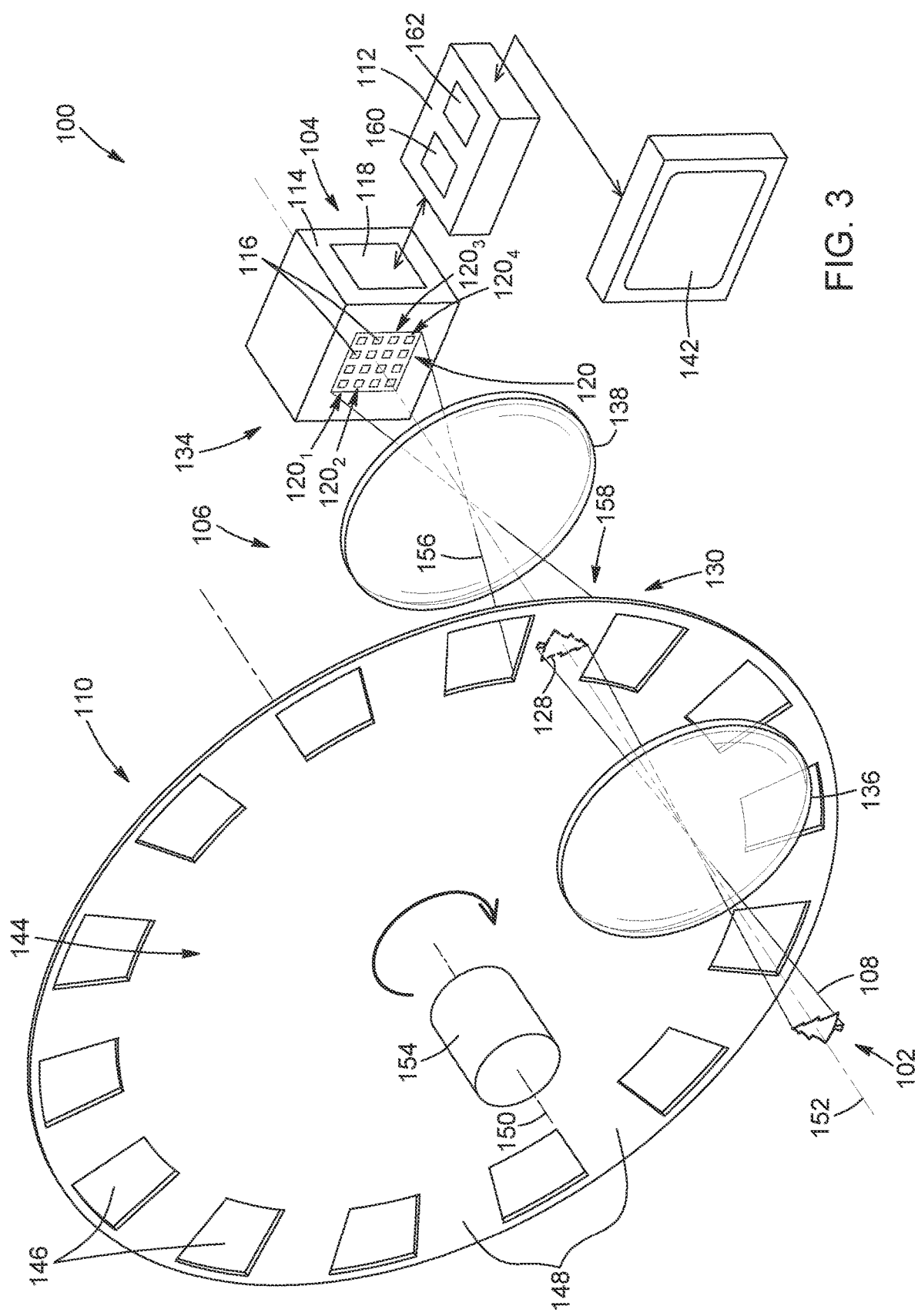
FIG. 3 is a schematic perspective view of the thermal imaging system of FIG. 1, depicted in a second operating configuration.
Figure 4:
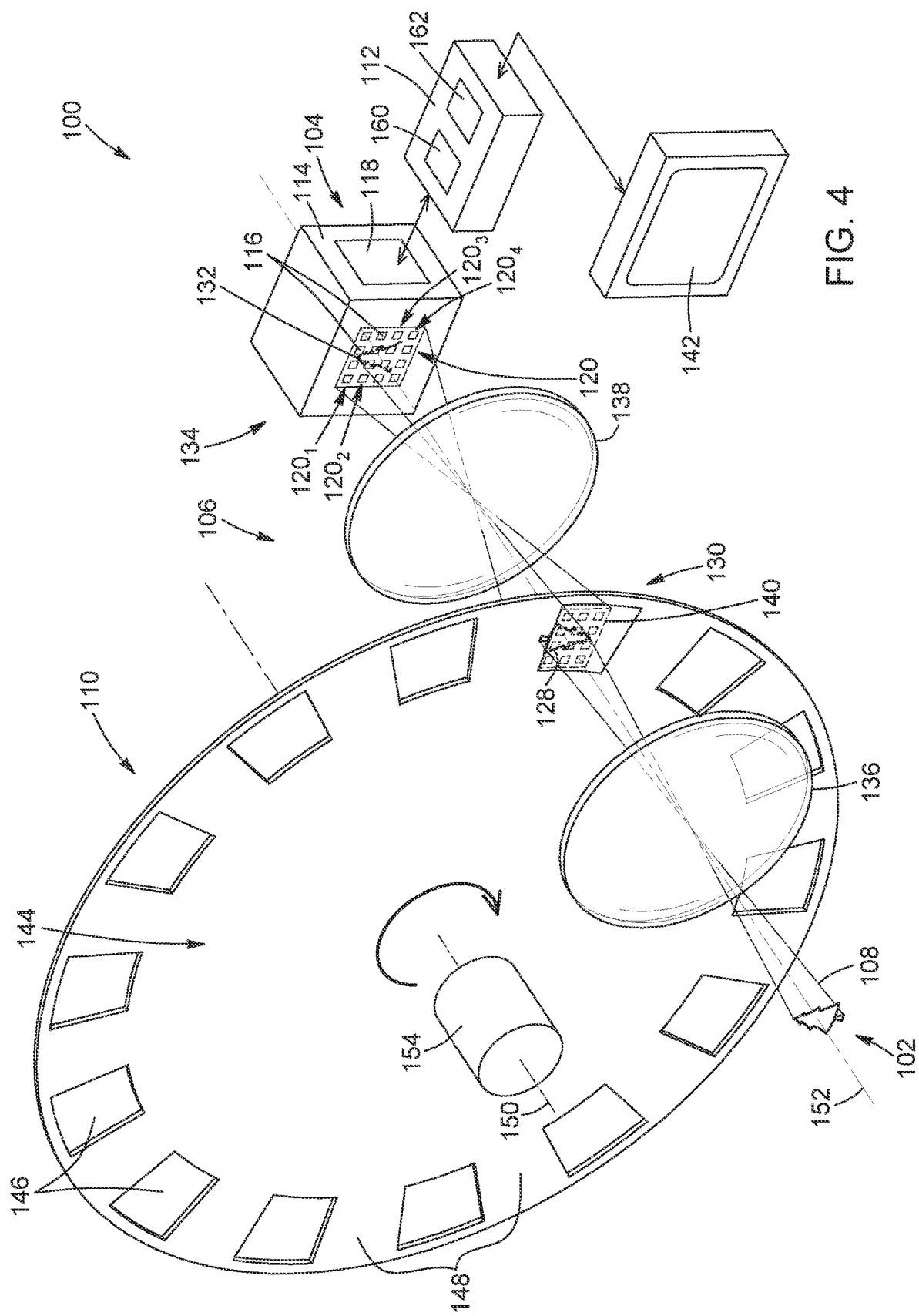
FIG. 4 is a schematic perspective view of the thermal imaging system of FIG. 1, depicted in a third operating configuration.
Figure 5:
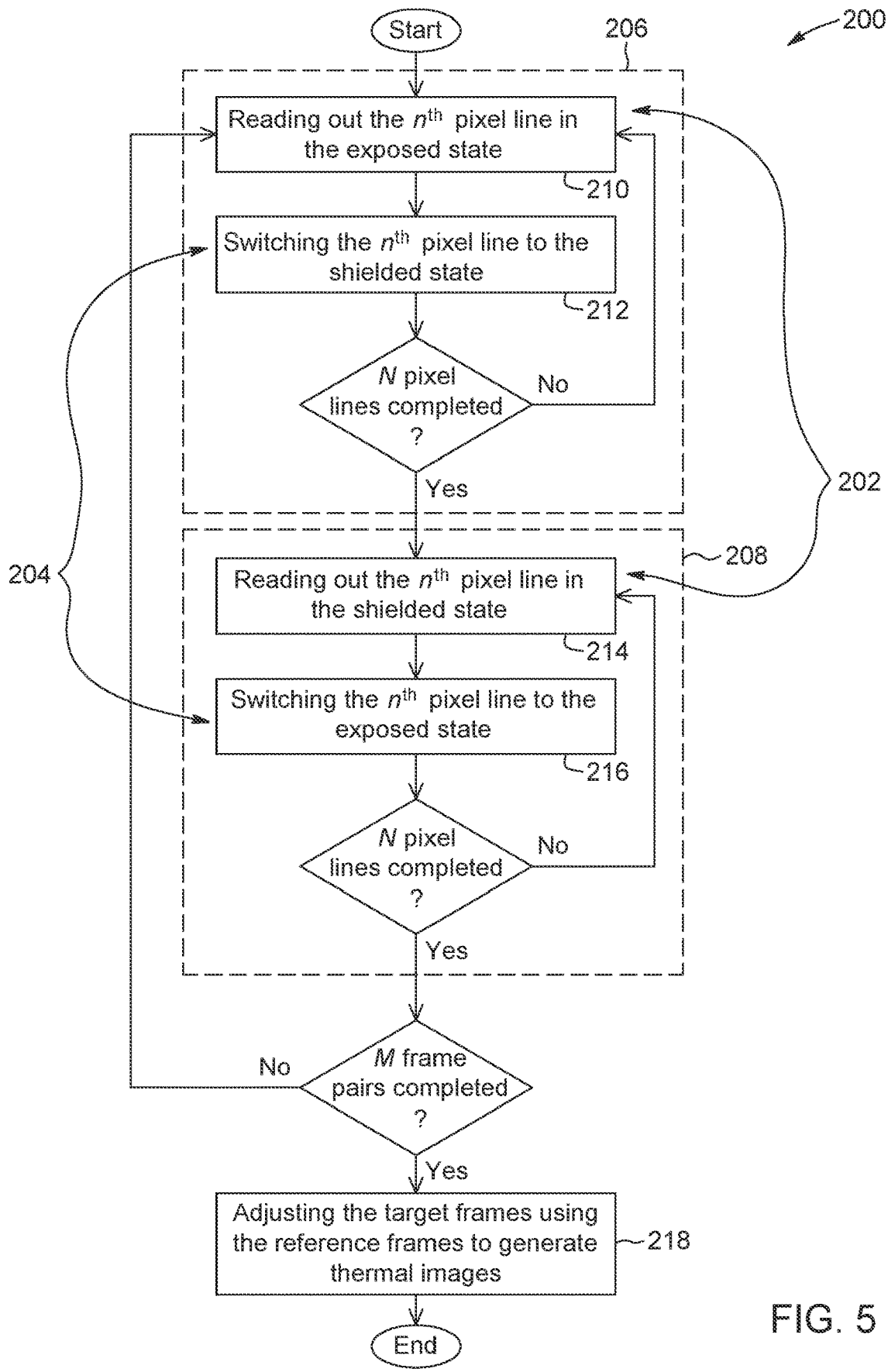
FIG. 5 is a flow diagram of a method of imaging a target scene, in accordance with an embodiment.

Referring to FIG. 5 in conjunction with FIGS. 1 and 3, a flow diagram of an embodiment of a method 200 of imaging a target scene 102 using a thermal imaging system 100 is depicted. The method 200 may be performed with the thermal imaging system 100 of FIGS. 1, 3, and 4, or another suitable thermal imaging system. As noted above, the thermal imaging system 100 includes an uncooled microbolometer array 104 having N lines 120 of microbolometer pixels 116. For example, N may range from about a hundred to about a thousand. Each one of the N pixel lines 120 is individually switchable between an exposed state, where the line 120 is exposed to electromagnetic radiation 108 from the target scene 102, and a shielded state, where the line 120 is shielded from electromagnetic radiation 108 from the target scene 102 and exposed to electromagnetic radiation 156 from a reference scene 158. The switching between the exposed state and the shielded state of the individual pixel lines 120 may be achieved by an optical chopper 110 disposed in the field of view of the microbolometer array 104. In such a case, the optical chopper 110 may define the reference scene 158 viewed by the microbolometer pixels 116 in the shielded state. The method 200 generally includes a frame generation operation 202 and a state switching operation 204, which are performed concurrently with each other, in a time-interleaved manner.

The frame generation operation 202 involves the generation of a set of M target frames of the target scene 102 and the generation of a corresponding set of M reference frames of the reference scene 158. The value of M may vary depending on the application. The frame generation operation 202 proceeds in a sequential manner, alternating between generating 206 a target frame and generating 208 a reference frame, and continuing as such until the M frames of each set have been generated. For the purpose of illustration, the frame generation operation 202 illustrated in FIG. 5 starts with the generation 206 of a target frame followed by the generation 208 of the corresponding reference frame. However, the converse is possible, in that the frame generation operation 202 may start with the generation of a reference frame followed by the generation of the corresponding target frame.

The generation 206 of the current target frame involves performing a rolling shutter readout operation. The current target frame may be referred to as the $m^{th}$ target frame, where $1 \leq m \leq M$. The rolling shutter readout operation includes a step 210 of sequentially reading out each one of the N pixel lines 120 in the exposed state and at a stabilized temperature. Concurrently with the generation 206 of the current target frame, a step 212 of the state switching operation 204 is performed. This step 212 involves sequentially switching each one of the N pixel lines 120 to the shielded state immediately or shorty after its readout in the exposed state, in preparation for its readout during the generation 208 of the next reference frame, that is, the $m^{th}$ reference frame. The readout step 210 and the switching step 212 are performed in an alternating manner N times each, that is, until each of the N pixel lines of the current target frame has been read out in the exposed state and switched to the shielded state.

Once the generation 206 of the current target frame has been completed, the method 200 proceed with the generation 208 of the current reference frame, that is, the $m^{th}$ reference frame. This step 208 also involves performing a rolling shutter readout operation. The rolling shutter readout operation includes a step 214 of sequentially reading out each one of the N pixel lines 120 in the shielded state and at a stabilized temperature. Concurrently with the generation 208 of the current reference frame, another step 216 of the state switching operation 204 is performed. This step 216 involves sequentially switching each one of the N pixel lines 120 to the exposed state immediately or shorty after its readout in the shielded state, in preparation for its readout during the generation 206 of the next target frame. The readout step 214 and the switching step 216 are performed in an alternating manner N times each, that is, until each of the N pixel lines of the current reference frame has been read out in the shielded state and switched to the exposed state.

It is appreciated that the method 200 illustrated in FIG. 5 involves (1) switching each pixel line 120 to the shielded state immediately or shortly after its readout in the exposed state, in preparation for its next readout in the shielded state, and (2) switching the state of each pixel line 120 to the exposed state immediately or shortly after its readout in the shielded state, in preparation for its next readout in the exposed state. In this manner, the time available for each pixel line 120 to reach a stabilized or steady-state thermal regime in its new environment (i.e., whether the target scene 102 or the reference scene 158) before its next readout (i.e., whether in the exposed state or the shielded state, respectively) is maximized or at least increased. The term "steady-state thermal regime" refers herein to a condition in which a given pixel line 120 may be considered to have reached a stabilized temperature prior to its readout. The time $t_{equil}$ required for a pixel line 120 to reach thermal equilibrium with its environment and the manner of determining this time may vary depending on the application. The time to reach a steady-state thermal regime may be related to the thermal time constant r of the microbolometer pixels 116. In some embodiments, the time to reach a steady-state thermal regime may be defined as being equal to or longer than the thermal constant r of the microbolometer pixels, for example, $t_{equil} \geq \tau$, $t_{equil} \geq 2\tau$, $t_{equil} \geq 3\tau$, $t_{equil} \geq 4\tau$, $t_{equil} \geq 5\tau$.

It is also appreciated that the time delay between the readout of the $n^{th}$ pixel line 120 in the exposed state as part of the generation of the $m^{th}$ target frame and the readout of the same $n^{th}$ pixel line 120 in the shielded state as part of the generation of the $m^{th}$ reference frame is equal to the frame readout time $t_{frame}$ of the target and reference frames. Thus, the time delay $\Delta t_{R-S}$ between the readout of the $n^{th}$ pixel line 120 in the exposed state and the switching of the $n^{th}$ pixel line to the shielded state should be small with respect to $t_{frame}$ in order to maximize or at least increase the time available for the $n^{th}$ pixel line 120 to reach thermal equilibrium before its reading in the shielded state as part of the generation of the $m^{th}$ reference frame. Likewise, the time delay $\Delta t_{R-S}$ between the readout of the $n^{th}$ pixel line 120 in the shielded state and its switching to the exposed state should be small with respect to $t_{frame}$ in order to maximize or at least increase the time available for the $n^{th}$ pixel line 120 to reach thermal equilibrium before its reading in the exposed state as part of the generation of the $(m+1)^{th}$ target frame.

The time delay $\Delta t_{R-S}$ between readout and state switching can take on different values depending on the application. In some embodiments, the time delay $\Delta t_{R-S}$ may be set substantially equal to or even less than the line readout time, $t_{line} = t_{frame}/N$, which means that the $n^{th}$ pixel line switches state before or during the readout of the $(n+1)^{th}$ pixel line. In such a case, the time available for the $n^{th}$ pixel line to reach thermal equilibrium before its next readout is equal to $(1-1/N)t_{frame}$ and is essentially maximized. In other embodiments, the time delay $\Delta t_{R-S}$ may be set equal to or less than $kt_{line}$, where k may range, for example, from 1 to 20, or from 1 to 10, or from 1 to 5. This means that the $n^{th}$ pixel line switches state before or during the readout of the $(n+k)^{th}$ pixel line. In such a case, the time available for the $n^{th}$ pixel line to reach thermal equilibrium before its next readout is equal to $(1-k/N)t_{frame}$. In yet other embodiments, the time delay $\Delta t_{R-S}$ may be set equal to or less than the difference between the frame readout time $t_{frame}$ and p times the thermal time constant r of the microbolometer, where p ranges from 2 to 5, which can be expressed mathematically as $\Delta t_{R-S} (t_{frame} - p\tau)$, $2 \leq \tau \leq 5$. It is noted that the case where p=2.3 corresponds to the time for the temperature of the microbolometer to reach 90% of its final value in response to a step change in the energy/power of the received electromagnetic radiation.

It is appreciated that the control of the time delay $\Delta t_{R-S}$ between the frame generation operation and the state switching operation may be achieved by using the control and processing unit 112 to synchronize or otherwise time-coordinate the rolling shutter readout operation performed by the readout circuitry 118 with the chopping operation performed by the optical chopper 110. Various techniques can be used to coordinate the operation of the readout circuitry 118 with the operation of the optical chopper 110. For example, in one embodiment, the required or desired synchronization or time-coordination between the frame generation operation and the state switching operation may be obtained by using a phase-locked loop technique.

Referring still to FIG. 5, once the M target frames and the M reference frames have been generated, the method 200 may include a step 218 of adjusting the M target frames using the M reference frames to generate thermal images of the target scene. In some embodiments, the adjustment step 218 may include a reference-frame subtraction operation that includes a step of subtracting each reference frame from the corresponding target frame in order to obtain M corrected target frames. In such embodiments, the adjustment step 218 may further include a frame averaging operation that includes a step of obtaining, as each thermal image, an average corrected target frame from all or a subset of the M corrected target frames. It is appreciated that a reference-frame subtraction operation can reduce or help reduce fixed pattern noise and banding noise and that a frame averaging operation can reduce or help reduce random noise. In other embodiments, the adjustment step 218 may include a step of obtaining an average target frame from all or a subset of the M target frames, a step of obtaining an average reference frame from all or a subset of the M reference frames, and a step of obtaining, as each thermal image, a corrected averaged target frame by subtracting the average reference frame from the average target frame. It is appreciated that the term "subtracting" is used herein to denote not only a simple subtraction between two elements, but also a more complex differential operation from which a difference between two elements may be evaluated. For example, two frames may be individually scaled or otherwise processed prior to being subtracted. Depending on the application, the thermal images can be displayed upon being generated, in real-time or near real-time, or be saved to memory for archival storage or later viewing, processing or sending to another location.

Figure 6:
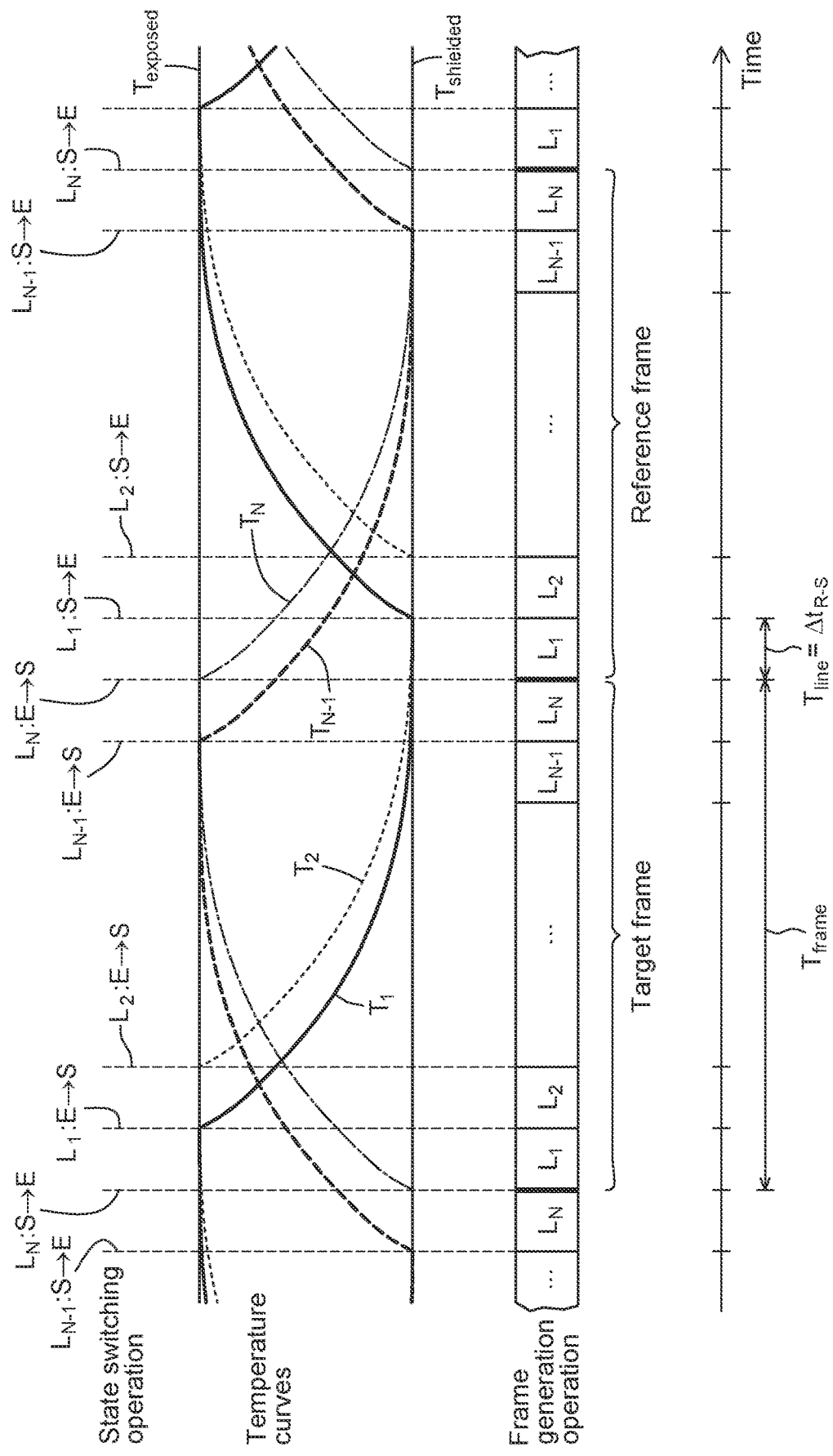
FIG. 6 is a timing diagram of a method of imaging a target scene, in accordance with an embodiment.

Referring to FIG. 6, there is depicted a timing diagram illustrating a frame generation operation and a state switching operation such as those described above with reference to the method 200 of FIG. 5. The frame generation operation depicted in FIG. 6 includes a step of generating a target frame of a target scene followed by a step of generating a reference frame of a reference scene, where both the target scene and the reference scene are assumed to have a uniform temperature distribution, for simplicity. Although the generation of a single target frame and a single reference frame is depicted in FIG. 6, multiple sets of alternating target and reference frames may be generated in other implementations, as described above. Both the target frame and the reference frame are generated in a rolling shutter mode. The generation of the target frame includes sequentially reading N pixel lines in the exposed state, while the generation of the reference frame includes sequentially reading the same N pixels in the shielded state. The N pixel lines are denoted as $L_1, L_2, \ldots, L_{N-1}, L_N$ in FIG. 6.

The state switching operation includes a step of sequentially causing the N pixel lines to transition to the shielded state as soon as they have been read out in the exposed state during the generation of the target frame, followed by a step of sequentially causing the N pixel lines to transition to the exposed state as soon as they have been read out in the shielded state during the generation of the reference frame. The time delay $\Delta t_{R-S}$ between the readout of a given pixel line in either state and its switching to the other state is set equal to the line readout time, $t_{line}$, or, equivalently, to the frame readout time divided by the number of pixel lines per frame, $t_{frame}/N$. This means that pixel lines $L_1, L_2,$ and $L_{N-1}$ switch to the shielded state during the readout of pixel lines $L_2, L_3$ and $L_N$ in the exposed state, respectively, and that pixel line $L_N$ switches to the shielded state during the readout of pixel line $L_1$ in the shielded state. This also means that pixel lines $L_1, L_2,$ and $L_{N-1}$ switch to the exposed state during the readout of pixel lines $L_2, L_3$ and $L_N$ in the shielded state, respectively, and that pixel line $L_N$ switches to the exposed state during the readout of pixel line $L_1$ in the exposed state during the generation of the next target frame. In FIG. 6, transitions of pixel lines from the exposed state to the shielded state are denoted by E→S, while transitions of pixel lines from the shielded state to the exposed state are denoted by S→E.

FIG. 6 also depicts curves of the temperature of pixel lines $L_1, L_2, L_{N-1},$ and $L_N$ as functions of time during the frame generation operation and the state switching operation. The temperature curves are denoted as $T_1, T_2, T_{N-1},$ and $T_N$ in FIG. 6. The temperature curves have the same profile but are time-shifted with respect to one another by integer multiples of the line readout time $t_{line}$. For example, $T_2, T_{N-1},$ and $T_N$ are respectively shifted by $t_{line}$, $(N-2)t_{line}$, and $(N-1)t_{line}$ with respect to $T_1$. It is appreciated that by setting $\Delta t_{R-S}$ to be substantially equal to $t_{line}$, the time available for each pixel line to reach thermal equilibrium before its next readout is maximized or at least increased. For example, by switching pixel line $L_1$ to the shielded state immediately after its readout in the exposed state, that is, during the readout of pixel line $L_2$, its temperature $T_1$ can start decreasing from its stead-state value in the exposed state, $T_{exposed}$, toward its steady-state value in the shielded state, $T_{shielded}$, without delay, thus making the best use of the time available before its next readout in the shielded state. It is appreciated that, in this manner, the probability that the temperature $T_1$ of pixel line $L_1$ has reached $T_{shielded}$ before the readout of pixel line $L_1$ in the shielded state may be maximized.

Numerous modifications could be made to the embodiments described above without departing from the scope of the appended claims.

The invention claimed is:

1. A method of imaging a target scene using a thermal imaging system comprising an uncooled microbolometer array having a plurality of lines of microbolometer pixels, each line of microbolometer pixels being individually switchable between an exposed state, where the line is exposed to electromagnetic radiation from the target scene, and a shielded state, where the line is shielded from electromagnetic radiation from the target scene and exposed to electromagnetic radiation from a reference scene, the method comprising:

performing a frame generation operation to generate a set of target image frames of the target scene and a set of reference image frames of the reference scene, the frame generation operation comprising alternating between:

generating a current one of the target image frames, said generating comprising sequentially reading out each line of microbolometer pixels in the exposed state; and generating a current one of the reference image frames, said generating comprising sequentially reading out each line of microbolometer pixels in the shielded state;

performing a state switching operation concurrently with the frame generation operation, the state switching operation comprising alternating between:

sequentially causing each line of microbolometer pixels to switch to the shielded state after the readout thereof in the exposed state during the generation of the current target image frame, in preparation for the generation of a next one of the reference image frames; and sequentially causing each line of microbolometer pixels to switch to the exposed state after the readout thereof in the shielded state during the generation of the current reference image frame, in preparation for the generation of a next one of the target image frames; and adjusting the target image frames using the reference image frames to generate thermal images of the target scene.

2. The method of claim 1, wherein each line of microbolometer pixels comprises a single row or a single column of microbolometer pixels.

3. The method of claim 1, further comprising:
providing an imaging optic assembly configured for receiving the electromagnetic radiation from the target scene, forming from the received electromagnetic radiation an intermediate image of the target scene in an intermediate image plane between the uncooled microbolometer array and the target scene, and projecting the intermediate image onto the uncooled microbolometer array for image capture by the microbolometer pixels; and
providing an optical chopper disposed in the intermediate image plane, the optical chopper defining the reference scene, and controlling the optical chopper to cause each line of microbolometer pixels to individually switch between the exposed state and the shielded state.

4. The method of claim 1, further comprising synchronizing the frame generation operation and the state switching operation with respect to each other, the synchronizing comprising controlling, for each line of microbolometer pixels, a time delay between the readout of the line in either one of the exposed state and the shielded state and the switching of the line to the other one of the exposed state and the shielded state.

5. The method of claim 4, wherein controlling the time delay comprises setting the time delay equal to or less than ten times a line readout time of the microbolometer pixel lines.

6. The method of claim 5, wherein controlling the time delay comprises setting the time delay equal to or less than the line readout time of the microbolometer pixel lines.

7. The method of claim 4, wherein controlling the time delay comprises setting the time delay equal to or less than a difference between a frame readout time of the microbolometer pixels and p times a thermal time constant of the microbolometer pixels, where p ranges from two to five.

8. The method of claim 1, wherein adjusting the target image frames using the reference image frames comprises subtracting each one of the reference image frames from a corresponding one of the target image frames to obtain a set of adjusted target image frames as the thermal images.

9. The method of claim 8, wherein adjusting the target image frames using the reference image frames further comprises performing a frame averaging operation on the set of adjusted target image frames.

10. The method of claim 1, wherein the electromagnetic radiation from the target scene and the electromagnetic radiation from the reference scene comprise infrared radiation.

11. A thermal imaging system for imaging a target scene, the thermal imaging system comprising:
an uncooled microbolometer array comprising a plurality of lines of microbolometer pixels and a readout circuitry electrically connected to the microbolometer pixels;
an imaging optic assembly configured to form an intermediate image of the target scene in an intermediate image plane and to project the intermediate image onto the microbolometer pixels;
an optical chopper disposed in the intermediate image plane, the optical chopper being configured to cause each line of microbolometer pixels to individually switch between an exposed state, where the line is exposed to electromagnetic radiation from the target scene, and a shielded state, where the line is shielded from electromagnetic radiation from the target scene and exposed to electromagnetic radiation from a reference scene defined by the optical chopper; and
a control and processing unit coupled to the uncooled microbolometer array and to the optical chopper, the control and processing unit being configured to:
perform a frame generation operation to generate a set of target image frames of the target scene and a set of reference image frames of the reference scene, the frame generation operation comprising alternating between:
generating a current one of the target image frames, said generating comprising controlling the readout circuitry to sequentially read out each line of microbolometer pixels in the exposed state; and
generating a current one of the reference image frames, said generating comprising controlling the readout circuitry to sequentially read out each line of microbolometer pixels in the shielded state;
perform a state switching operation concurrently with the frame generation operation, the state switching operation comprising alternating between:
controlling the optical chopper to sequentially cause each line of microbolometer pixels to switch to the shielded state after the readout thereof in the exposed state during the generation of the current target image frame, in preparation for the generation of a next one of the reference image frames; and
controlling the optical chopper to sequentially cause each line of microbolometer pixels to switch to the exposed state after the readout thereof in the shielded state during the generation of the current reference image frame, in preparation for the generation of a next one of the target image frames; and
adjust the target image frames using the reference image frames to generate thermal images of the target scene.

12. The thermal imaging system of claim 11, wherein each line of microbolometer pixels comprises a single row or a single column of microbolometer pixels.

13. The thermal imaging system of claim 11, wherein the imaging optic assembly comprises an objective lens configured to form the intermediate image of the target scene in the intermediate image plane, and a relay lens configured to relay the intermediate image to the microbolometer pixels.

14. The thermal imaging system of claim 11, wherein the optical chopper comprises a set of radiation-transmitting regions and a set of radiation-blocking regions, the radiation-transmitting regions and the radiation-blocking regions each having a region dimension that is substantially the same as an image dimension of an image of the lines of microbolometer pixels in the intermediate image plane, the region dimension and the image dimension being defined along a direction perpendicular to the lines of microbolometer pixels.

15. The thermal imaging system of claim 14, wherein the optical chopper is a rotating chopper.

16. The thermal imaging system of claim 11, wherein the control and processing unit is configured to control the readout circuitry and the optical chopper to synchronize the frame generation operation and the state switching operation with respect to each other by controlling, for each line of microbolometer pixels, a time delay between the readout of the line in either one of the exposed state and the shielded state by the readout circuitry and the switching of the line to the other one of the exposed state and the shielded state by the optical chopper.

17. The thermal imaging system of claim 16, wherein the control and processing unit is configured to set the time delay equal to or less than ten times a line readout time of the microbolometer pixel lines.

18. The thermal imaging system of claim 16, wherein the control and processing unit is configured to set the time delay equal to or less than a difference between a frame readout time of the microbolometer pixels and p times a thermal time constant of the microbolometer pixels, where p ranges from two to five.

19. The thermal imaging system of claim 11, wherein the control and processing unit is configured to adjust the target image frames using the reference image frames by subtracting each one of the reference image frames from a corresponding one of the target image frames to obtain a set of adjusted target frames as the thermal images.

20. The thermal imaging system of claim 19, wherein the control and processing unit is configured to perform a frame averaging operation on the set of adjusted target frames.

* * * * *